Patented May 8, 1934

1,957,788

UNITED STATES PATENT OFFICE 1,957,788

METHOD OF REFINING ROSIN

Donald A. Lister, Brunswick, Ga., assignor to Hercules Powder Company, Wilmington, Del., a corporation of Delaware No Drawing. Application August 22, 1929, Serial No. 387,809

10 Claims. (Cl. 87—2)

My invention relates to a method of refining rosin which is applicable to the refining of either wood or gum rosin and which more especially has the effect of lightening the color of rosin and of decreasing its tendency to discolor in contact with oxygen as contained in the air and on heating. The method in accordance with my invention also has the effect of decreasing the tendency of rosin to crystallize.

The method in accordance with my invention involves primarily the treatment of rosin with a halogen, as iodin, chlorine, bromine, etc., or with more than one halogen. If desired, the added halogen when normally a solid, as iodin, may be added in solution, as for example, dissolved in a suitable solvent, such as pinene, gasoline, etc.

In carrying my invention into practice the rosin is desirably melted in order to give it a substantial fluidity enabling desirable contact between the rosin and the halogen used for the refining. The rosin may be brought to a desired condition of fluidity by heating to a temperature of say about 150° C., or say within about the range 140° C.–155° C. In refining rosin in accordance with my invention the rosin is desirably, though not necessarily, subjected to a heat treatment by maintaining the temperature at which it is melted for a period of time or by elevating the temperature over a period of time after the addition of the halogen used for refining. The heat treatment may involve, for example, raising the temperature of the rosin over a period of time to a point below the temperature at which the rosin will substantially decompose under the conditions of treatment, say a temperature of about 350° C., or within the range 150° C.–350° C. under atmospheric pressure. When the rosin is subjected to heat treatment after addition of the halogen, the temperature may be raised to the desired point over a period ranging from say about 3 minutes to about fifty minutes or longer. The rosin after treatment is cooled in the absence of air, as in the presence of an inert gas, in a vacuum, or the like.

In the practical adaptation of my invention, for example, iodin may be added to the rosin, which has been reduced to a state of substantial fluidity, in amount within about the range .001%–0.1%, or in the amount preferably of about .01%, chlorine, for example, may be bubbled through the rosin, which has been reduced to a state of substantial fluidity, in amount within about the range .01%–0.1% and bromine may be added to the rosin, which has been reduced to a state of substantial fluidity, in amount within about the range .05%–0.5%.

As has been indicated, in the practical adaptation of my invention more than one halogen may be used, as for example, iodin and chlorine, or iodin and bromine, etc., which may be used in desired quantities, the iodin being added to the rosin, as such or in solution, and the chlorine or bromine bubbled. By way of illustration say .001% of iodin may be added to the rosin and .01%–0.1% chlorine bubbled through.

In the practical adaptation of my invention the rosin, after treatment with a halogen is permitted to cool, in the absence of air, whether the temperature is elevated or not, and is then ready for use or shipment.

By way of illustrating the practical adaptation of my invention, for example, to the refining of a wood rosin, for example, 600 g. of wood rosin, color grade FF, is heated to a temperature of about 145° C., at which temperature it will be substantially fluid, and about 0.1% of iodin added. If desired the iodin may be dissolved in a solvent such as pinene, alcohol, etc. and say about 12 grams of a 5.0% solution added to the rosin. The temperature is then raised to say about 300° C. over a period of about 50 minutes and the rosin cooled in the absence of air, as in the presence of an inert gas, or in a vacuum. The rosin, after the indicated treatment, will be found to have a color equal to F grade gum rosin.

As illustrative of the practical adaptation of my invention to a gum rosin, for example, 600 g. of gum rosin, color grade N, is heated to a temperature of about 148° C., at which temperature it will be substantially fluid. To the melted rosin is added about 0.1% of iodin and the temperature of the rosin is raised to about 300° C. in a period of about 25 minutes, after which the rosin is cooled. The product will be found to be of a color equal to X grade gum rosin.

As illustrative of the practical adaptation of my invention to the treatment of, for example, wood rosin with the use of chlorine, for example, 600 g. of wood rosin, color grade I, is melted say at a temperature of about 150° C. and chlorine bubbled through the melted rosin for a period of about 3 minutes, after which the temperature of the rosin is raised to about 300° C. over a period of about 50 minutes and the rosin then cooled in the absence of air. The product will be found of a color equal to WW gum rosin.

As illustrative of the practical adaptation of my invention with the use of, for example, iodin and chlorine, for example, a quantity of wood rosin, color grade I, is heated to a temperature of about 140° C. and .0075% of iodin added in solution if desired. After the addition of the iodin, chlorine is bubbled through the rosin for a period of about 3 minutes and the temperature of the rosin is then raised to about 300° C. over a period of about 1 hour and the rosin is then cooled in the absence of air. The product will be found to have a color equal to WW gum rosin. As a still further illustration of the practical adaptation of my invention, for example, a quantity of wood rosin, color grade I, is melted at a temperature of about 145° C. and 0.1% iodin added. The temperature of the rosin, after the addition of iodin, is raised to about 165° C. and held for a period of 5 minutes, after which the rosin is cooled. The product will be found to have a color equal to grade M gum rosin, and will be found very strongly resistant to discoloration in the presence of air, or where air is bubbled through it, even at high temperatures.

It will be understood that my invention, from the broad standpoint, involves the treatment of rosin with a halogen, the rosin being heated, or otherwise treated, to render it substantially fluid, enabling the halogen to be contacted with the rosin and that more specifically my invention involves the treatment of rosin with a halogen followed by a period of heat treatment at a temperature above that required to render the rosin substantially fluid, or at increasing temperature over a period of time.

It will be understood that the method in accordance with my invention may be applied to the refining of either wood or gum rosin, both of which are contemplated by me in the use of the term rosin herein and in the claims appended hereto.

Having now fully described my invention, what I claim and desire to protect by Letters Patent is:

1. The method of refining rosin which includes the step melting rosin and subjecting the melted rosin to treatment with a halogen while raising the temperature of the rosin from about 150° C. to 350° C.

2. The method of refining rosin which includes the step melting rosin, adding iodin to the melted rosin and raising the temperature of the rosin from about 150° C. to 350° C.

3. The method of refining rosin which includes the step melting rosin, adding iodin to the melted rosin and raising the temperature of the rosin from about 150° C. to 350° C. while bubbling chlorine gas through the rosin.

4. The method of refining rosin which includes the step heating rosin to a temperature within about the range 145° C.–150° C. and subjecting the rosin to treatment with a halogen while raising the temperature of the rosin to about 300° C.

5. The method of refining rosin which includes the step heating rosin to a temperature within about the range 145° C.–150° C., adding from about .001% to about 0.1% of iodin to the rosin and raising the temperature of the rosin to about 300° C.

6. The method of refining rosin which includes the step heating rosin to a temperature within about the range 145° C.–150° C., adding from about .001% to about 0.1% of iodin to the rosin, introducing chlorine into the rosin and raising the temperature of the rosin to about 300° C.

7. The method of refining rosin which includes the step heating rosin to a temperature within about the range 145° C.–150° C., adding from about .001% to about 0.1% of iodin to the rosin, introducing from about .01% to about 0.1% of chlorine into the rosin and raising the temperature of the rosin to about 300° C.

8. The method of refining rosin which includes the step of subjecting rosin rendered liquid by heat to treatment with a halogen at a temperature to maintain the fluidity of the rosin and cooling the heated rosin in the absence of air.

9. The method of refining rosin which includes the step of subjecting rosin rendered liquid by heat to treatment with bromine at a temperature to maintain the fluidity of the rosin and cooling the heated rosin in the absence of air.

10. The method of refining rosin which includes the step of subjecting rosin rendered liquid by heat to treatment with iodin at a temperature to maintain the fluidity of the rosin and cooling the heated rosin in the absence of air.

DONALD A. LISTER.